United States Patent
Kopac

[19]

[11] Patent Number: 5,861,699

[45] Date of Patent: Jan. 19, 1999

[54] ELECTRIC MACHINE, IN PARTICULAR ELECTRIC MOTOR

[75] Inventor: Ljubomir Kopac, Pordenone, Italy

[73] Assignee: Sole S.p.A., Pordenone, Italy

[21] Appl. No.: 805,288

[22] Filed: Feb. 25, 1997

[30] Foreign Application Priority Data

Mar. 12, 1996 [IT] Italy .................................. PN96A0017

[51] Int. Cl.⁶ .................................................... H02K 1/12
[52] U.S. Cl. .......................... 310/254; 310/51; 310/179; 310/186; 310/258; 310/261
[58] Field of Search ............... 310/51, 186, 254, 310/181, 269, 193, 261, 216, 258

[56] References Cited

U.S. PATENT DOCUMENTS

| | | | |
|---|---|---|---|
| 4,131,814 | 12/1978 | Donahoo | 310/172 |
| 4,670,696 | 6/1987 | Byrne et al. | 318/701 |
| 4,678,960 | 7/1987 | Frister | 310/42 |
| 4,730,136 | 3/1988 | Muller | 310/68 R |
| 4,755,698 | 7/1988 | Frister et al. | 310/51 |
| 4,854,034 | 8/1989 | Archibald et al. | 29/596 |
| 4,998,032 | 3/1991 | Burgbacher | 310/51 |
| 5,122,697 | 6/1992 | Horst | 310/181 |
| 5,331,245 | 7/1994 | Burgbacher et al. | 310/186 |
| 5,604,388 | 2/1997 | Baker et al. | 310/51 |
| 5,604,678 | 2/1997 | Neuenschwander | 364/476 |

*Primary Examiner*—Nestor Ramirez
*Assistant Examiner*—Elvin G. Enad
*Attorney, Agent, or Firm*—Pearne, Gordon, McCoy & Granger LLP

[57] ABSTRACT

Electric machine in which parts subject to magnetostrictive forces are sized and configured in a particular manner. Such parts (1) have radial dimensions that vary along the axial direction. The pads are formed by laminations (12) that are assembled in an alternated arrangement, either individually or by groups, and have differing inner and/or outer dimensions and/or shapes. Such a solution is instrumental in reducing the noise caused by vibrations brought about by the electromagnetic forces generated by the machine.

12 Claims, 4 Drawing Sheets

ELECTRIC MACHINE, IN PARTICULAR ELECTRIC MOTOR

BACKGROUND OF THE INVENTION

The present invention relates generally to an electric machine, such as an electric motor, and in particular to the sizing and the shaping of the parts thereof, which are subject to magnetostrictive forces, such as rotor and stator stacks.

Magnetic fields that are present in electrical machines generate forces that are substantially the main function and purpose of such machines. However, these forces also tend to mechanically distort the working parts, that is, the parts that are involved in the operation of the machine. As a consequence, the tangential component of the electromagnetic forces generating the working torque in an electric motor acts on the rotor and stator teeth and distorts them in a tangential direction. The radial component, although usually undesired, is always present and in some cases, such as in variable reluctance motors, reaches quite high values and causes radial distortions. These forces, which are generally variable with time, bring about elastic deformations and, hence, vibrations of the machine. If the natural mechanical-resonance frequencies happen to be present in the vibrations, such vibrations are amplified and the machine can become quite noisy.

BRIEF SUMMARY OF THE INVENTION

It is therefore a purpose of the present invention to reduce the noise generated by electrical machines due to the vibrations caused by the electromagnetic forces generated in the machine and amplified by the natural mechanical resonances of the structure of the machine.

This aim is reached in a mechanical structure of the electrical machine which, when the machine is operating, has attenuated vibrational responses to the natural mechanical-resonance frequencies. Such a structure requires the ferromagnetic parts to be given dimensions that vary in a discontinuous manner in an axial direction, that is, in the direction perpendicular to the surface of the laminations. This invention calls for the construction of the lamination stacks to be modified in such a manner as to cause the outer and/or inner surface of the finished stack to be uneven. It has been demonstrated experimentally that such an unevenness proves advantageous in reducing the noise generated by electrical machines.

BRIEF DESCRIPTION OF THE SEVERAL VIEWS OF THE DRAWING

The advantages and the features of the present invention will be more clearly understood from the description which is given below by way of non-limiting example with reference to the accompanying drawings, in which:

FIG. 2b is a schematic front view of a stator lamination stack made using laminations as shown in FIG. 2a;

FIG. 3a is a partial schematic front view of a form of a lamination for the stator stack of an electric motor which is alternative to the one illustrated in FIG. 2a;

FIG. 3b is a partial front schematical view of a stator stack made with laminations as shown in FIG. 3a;

FIG. 4b is a front schematical view of a stator stack with laminations as shown in FIG. 4a.

DETAILED DESCRIPTION OF THE INVENTION

Figure 1A:
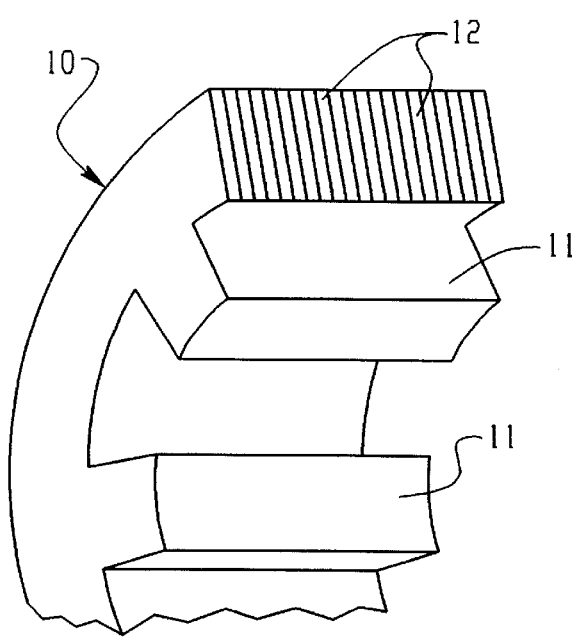
FIG. 1a is a partial schematic perspective view of a stator of an electric motor according to the prior art.

Generally, the parts of an electric motor which are subject to magnetostrictive forces, such as rotor and stator stacks, have constant radial dimensions along their axial direction, since they are made of laminations that have a symmetrical shape and are assembled in a symmetrical manner. FIG. 1a, which illustrates a prior-art technique, shows a portion of a stator stack 10 for an electric variable-reluctance motor with six salient poles 11 (two shown), in which the shape and the assembly of the laminations 12 corresponds to the above description. Motors provided with stator stacks of this type are therefore subject to the aforecited drawbacks.

The forces generated under operating conditions in variable reluctance motors are particularly strong in their amplitude and have a shape that varies with time, with a high content of high frequencies. As a result, the solution according to the present invention is particularly advantageous for this type of motor, although it proves very valuable also in cutting the noise generated by all types of electric machines in general.

According to the invention, the ferromagnetic parts of the motor are therefore sized to have different radial dimensions. This translates into a cross-section of the motor which, correspondingly to the shape of the laminations used, is not constant. Since strains and natural mechanical-resonance frequencies in both radial and axial directions are a function of the shape of the laminations, by providing for this shape to vary along the stator and rotor stacks, the result is obtained that vibrations in the various points of the motor will be different from each other and will neutralize each other.

There are several ways in which the invention can be embodied in an electric motor:

(a) by appropriately machining or otherwise processing the rotor or stator stack mechanically;

(b) by forming the stacks using laminations having dimensions that differ from each other such as to modify the ultimate mechanical response; and (c) by using laminations which have a similar, but asymmetrical shape, and by appropriately rotating them with respect to each other when forming the stacks.

Figure 1B:
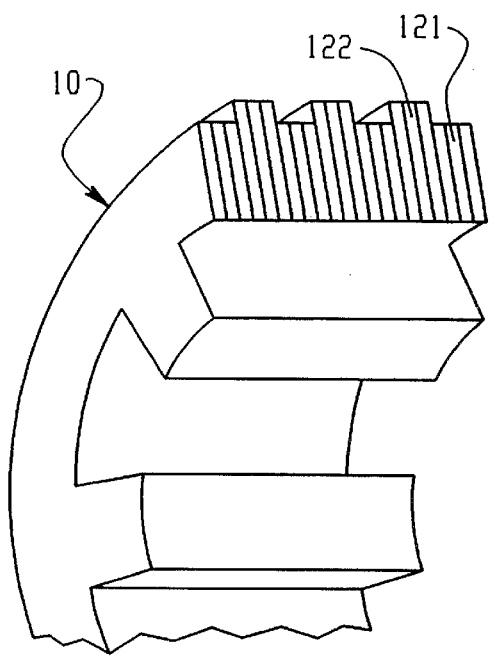
FIGS. 1b, 1c and 1d are partial schematic perspective views of three different embodiments of a stator of an electric motor according to the present invention.
Figure 1C:
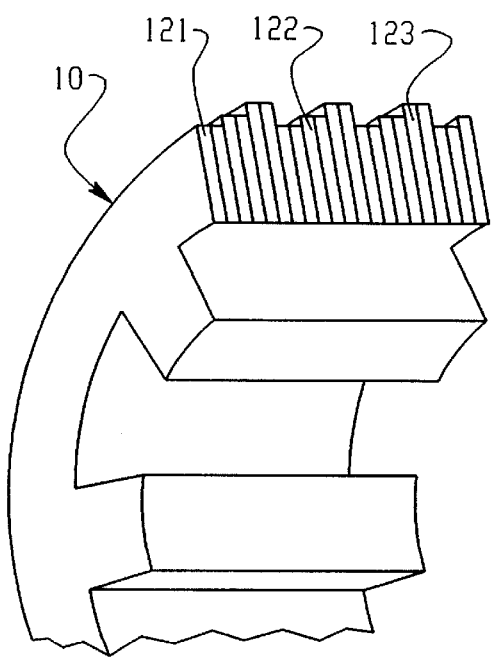
Figure 1D:
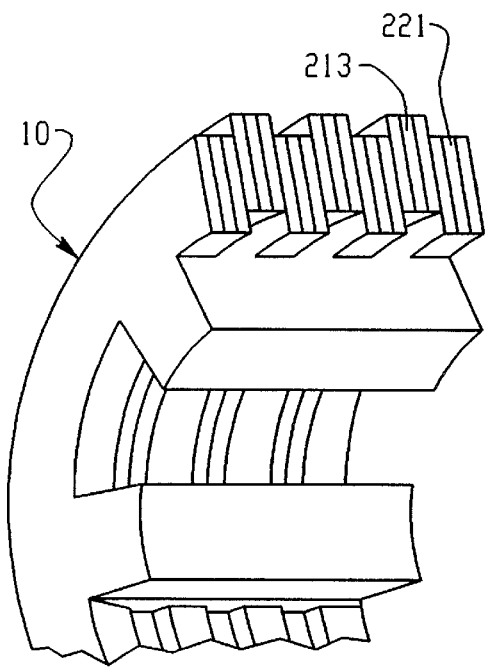

FIGS. 1b, 1c and 1d illustrate a schematical perspective of a portion of the stator stack of a variable reluctance motor, in which the cross-section in the axial direction of the stator yoke according to three alternative embodiments of the present invention can be seen. In both the description and the drawings accompanying this patent specification, similar reference numerals are used to indicate similar or corresponding items in different views.

FIG. 1b illustrates a stator stack 10 formed by laminations that have two different outer diameters 121, 122 grouped in an alternating manner.

FIG. 1c illustrates a stator stack 10 formed by laminations that have three different outer diameters 121, 122, 123 grouped in an alternating manner.

FIG. 1d illustrates a stator stack 10 in which both the outer diameter and the inner diameter of the yoke are varied. This can be achieved by alternating groups of laminations 212, 213 having different inner and outer diameters.

Figure 2A:
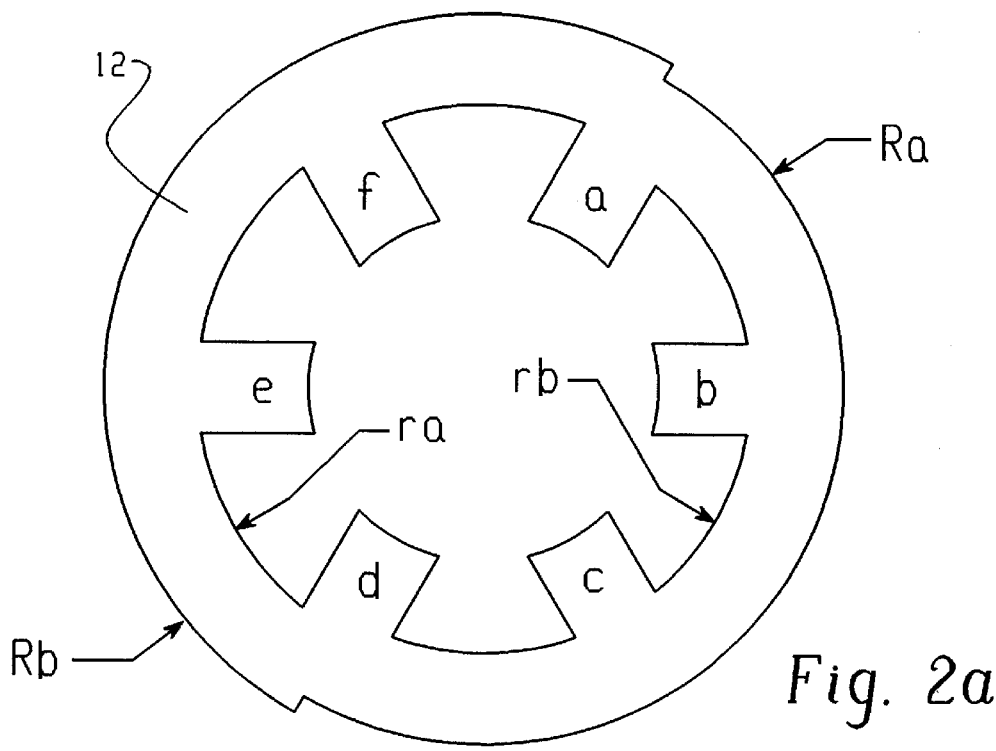
FIG. 2a is a front view of a lamination for making a stator stack in accordance with the present invention.
Figure 2B:
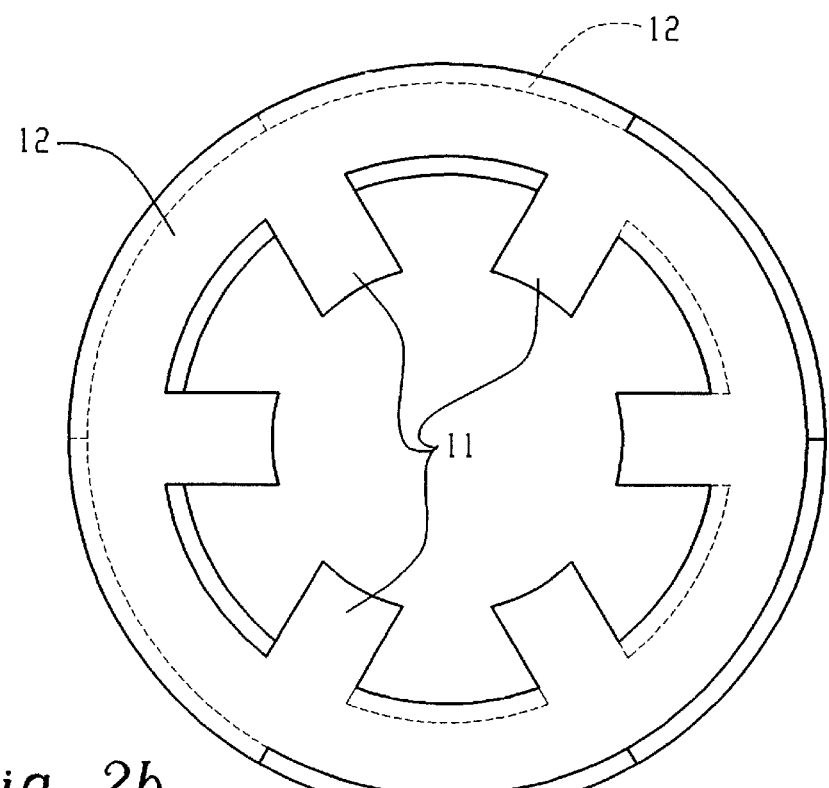

FIGS. 2a and 2b illustrate a further embodiment of the invention that makes use of laminations having a single shape. The lamination 12 has a mechanically asymmetrical design with respect to at least one axis. The inner dimensions ra and rb are different from each other and the outer dimensions Ra and Rb of the yoke are different from each other. In particular, with respect to the radial axis passing through the pole shoes a and d, the half-yoke containing the pole shoes b and c has smaller diameters Ra, rb than the half-yoke containing the pole shoes e and f.

When forming the stator stack, the laminations are assembled in an arrangement in which they are mutually rotated, either individually or in groups, by an angle which is equal to or a multiple of the angle between two salient poles. In this manner, a pole of the stator stack is formed by the different pole shoes (from a through to f, in FIG. 2a) of the respective stacked laminations 12.

FIG. 2b is a front schematical view of a stator stack formed by laminations according to FIG. 2a, but rotated by an angle of 60° with respect to each other.

It will of course be appreciated that the variation in the dimensions of the laminations can be obtained also in manners differing from the above illustrated one without departing from the scope of the present invention, while ensuring that the aim of the present invention is anyway effectively reached.

Figure 3A:
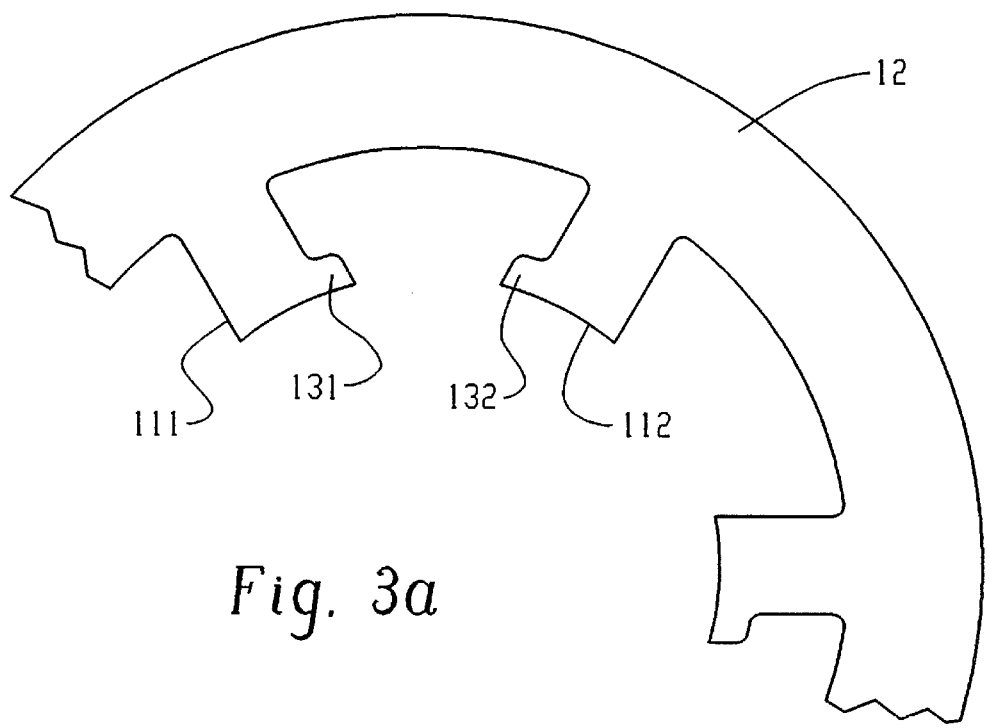
Figure 3B:
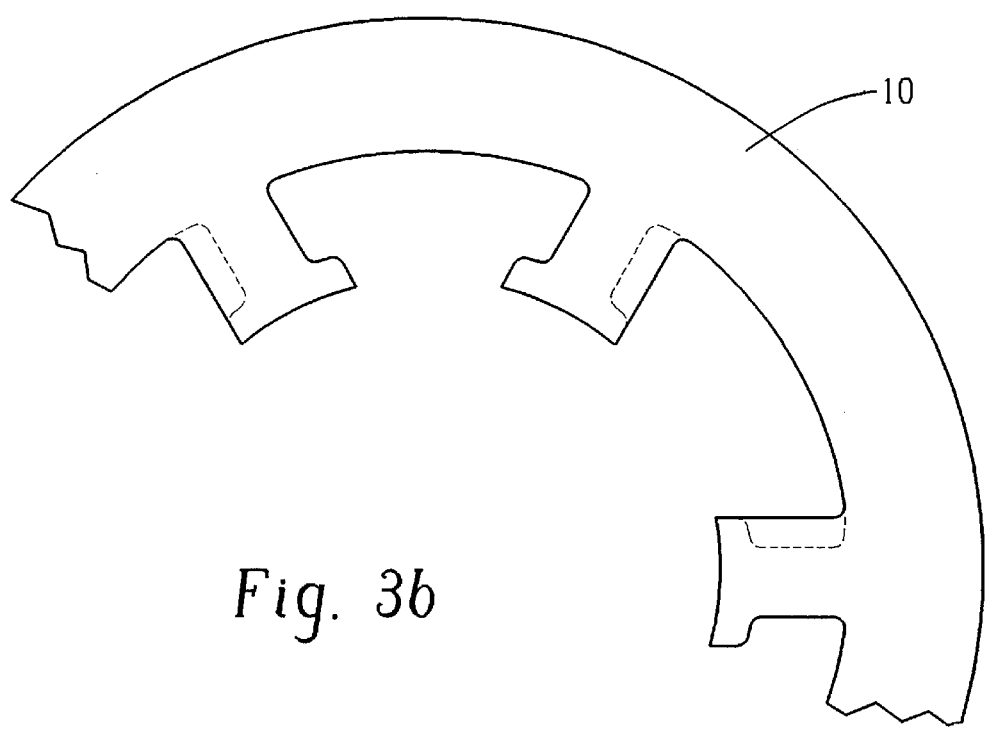

FIGS. 3a and 3b illustrate a further application of the principle of the present invention to the pole shoes of the stator. In particular, FIG. 3a is a front view of a portion of lamination 12 with asymmetrically shaped pole shoes. In this particular case, the pole shoes 111 and 112 are alternately provided with a lateral, mutually opposing appendix 131, 132. After the stator stack has been formed with the laminations rotated by an angle of 60° with respect to each other, the axial section of the pole shoe is no longer uniform, as this can be seen in FIG. 3b.

Figure 4A:
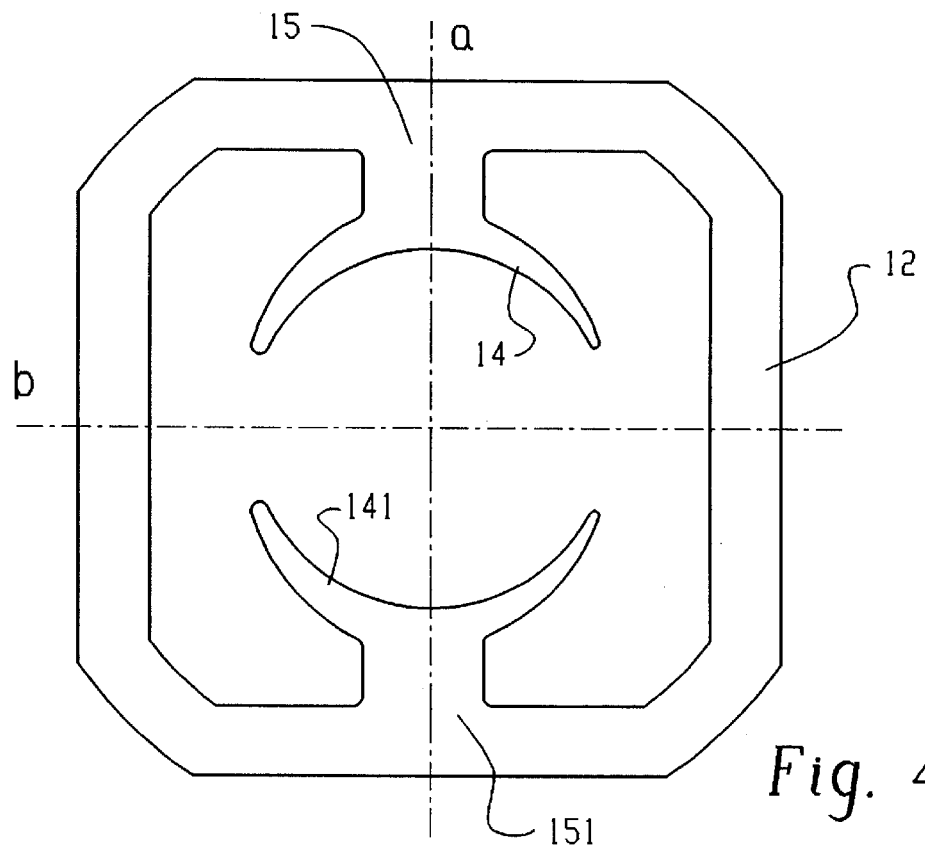
FIG. 4a is a front view of a further lamination shape according to the present invention.
Figure 4B:
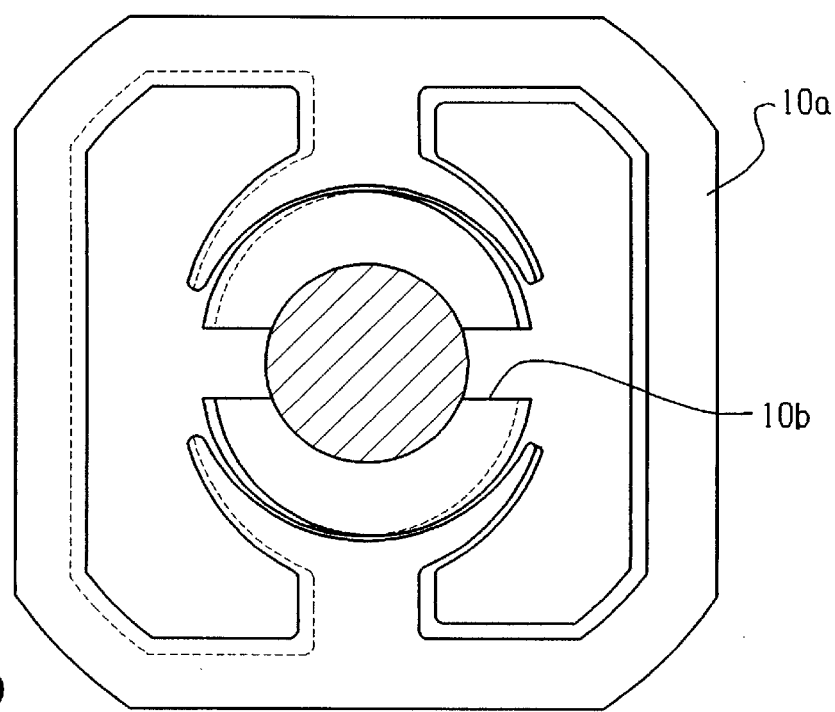

FIGS. 4a and 4b illustrate an application of the invention to the stator stack of a commutator motor. The lamination 12 shown in FIG. 4a is asymmetrical with respect to the axis a since the inner dimensions of both the yoke 14, 141 and the pole shoe 15, 151 are varying. By rotating the laminations by 180° when forming the stack, a stator is obtained which has dimensions that vary along the axial direction. In FIG. 4b, the respective dimensions can be seen to assume two different values in the stator stack 10a and rotor stack 10b, as this is represented with a continuous and a dashed line, respectively. The same lamination can be made to a shape that is asymmetrical also with respect to the axis b, so as to obtain, by rotating the various stacked laminations individually or by groups also about the axis b, four different dimensions on the four sides of the stator.

In conclusion, the present invention aims at solving or drastically improving the problem of the noise generated by electric motors and similar electric machines through an axial modification of the shape and/or the size of both rotor and stator stacks, in such a manner that the mechanical vibrations brought about by the electromagnetic forces are sharply reduced. As already pointed out, such an irregular configuration of the lamination stacks can also be obtained by various possible kinds of machining or mechanical processes, for instance by drilling holes or cutting slots in the stacks. In any case, the desired results shall always be the outcome of a variation in the shape and/or radial dimensions of the stack along the axial direction thereof.

It will, of course, be appreciated that the principle of the present invention can be applied to other electric machines as well such as, for instance, transformers or inductors, to the purpose of reducing the noise caused by vibrations brought about by the electromagnetic forces generated by the machines themselves.

What is claimed is:

1. An electric machine comprising a first lamination and a second lamination stacked on a longitudinal axis, the first and the second laminations having a same radially varying shape, wherein the first lamination is angularly offset with respect to the second lamination so that a radial dimension of the first lamination varies in a discontinuous manner from a radial dimension of the second lamination along the longitudinal axis.

2. An electric machine according to claim 1, characterized in that the first lamination and the second lamination have a same asymmetrical shape with respect to at least a transverse axis.

3. An electric machine according to claim 1, wherein the angular offset between the first and second laminations is one pole pitch.

4. An electric machine according to claim 1, wherein the first and second laminations form a stator yoke, a rotor is disposed coaxially with the stator yoke and a transverse axis through the discontinuity between the first and the second laminations intersects the rotor.

5. An electric machine according to claim 1, wherein the discontinuous variance in radial dimension along the longitudinal axis is effective to attenuate vibrational response of the machine caused by electromagnetic forces which are amplified by mechanical resonance frequencies.

6. An electric machine according to claim 1, wherein a plurality of first laminations are alternately stacked along the longitudinal axis with a plurality of second laminations to form a yoke.

7. An electric motor according to claim 1, wherein a plurality of first laminations are stacked adjacent one another to form a first group of laminations and a plurality of second laminations are stacked adjacent one another to form a second group of laminations, the first and the second groups of laminations being stacked along the longitudinal axis to form a yoke.

8. An electric motor according to claim 7, wherein a plurality of first groups of laminations are alternately stacked along the longitudinal axis with a plurality of second groups of laminations to form the yoke.

9. An electric machine comprising, a plurality of first lamination groups, each first lamination group having at least one first lamination, the first lamination having a first radial dimension, and a plurality of second lamination groups, each second lamination group having at least one second lamination, the second lamination having a second radial dimension, the second radial dimension being different from the first radial dimension of the first lamination, wherein the first lamination groups and the second lamination groups are alternately stacked along a longitudinal axis to form a yoke, the yoke having radial discontinuities along the longitudinal axis formed by adjacent first and second lamination groups.

10. An electric machine according to claim 9, wherein the discontinuous variance in radial dimension is effective to attenuate vibrational response of the machine caused by electromagnetic forces which are amplified by mechanical resonance frequencies.

11. An electric machine according to claim 9, wherein each first lamination group has a plurality of first laminations stacked adjacent one another and each second lamination group has a plurality of second laminations stacked adjacent one another.

12. An electric machine comprising, a stator having a first lamination and a second lamination stacked on a longitudinal axis, the first and second laminations having different radial dimensions so that a radial dimension of the first lamination varies in a discontinuous manner from a radial dimension of the second lamination along the longitudinal axis, and a rotor intersects a transverse axis through the discontinuity between the first and the second laminations.

* * * * *